US011137308B2

(12) United States Patent
Craddock et al.

(10) Patent No.: US 11,137,308 B2
(45) Date of Patent: Oct. 5, 2021

(54) HIGH SENSITIVITY PRESSURE SENSOR PACKAGE

(71) Applicant: Baker Hughes, a GE Company, LLC, Houston, TX (US)

(72) Inventors: Russell Craddock, Groby (GB); Martin Marshall, Leicester (GB)

(73) Assignee: Baker Hughes, a GE Company, LLC, Houston, TX (US)

( * ) Notice: Subject to any disclaimer, the term of this patent is extended or adjusted under 35 U.S.C. 154(b) by 220 days.

(21) Appl. No.: 16/238,207

(22) Filed: Jan. 2, 2019

(65) Prior Publication Data
US 2020/0209090 A1    Jul. 2, 2020

(51) Int. Cl.
*G01L 13/02* (2006.01)
*G01L 19/06* (2006.01)

(52) U.S. Cl.
CPC ........ *G01L 13/026* (2013.01); *G01L 19/0645* (2013.01)

(58) Field of Classification Search
CPC ... G01L 19/02; G01L 19/0618; G01L 13/025; G01L 13/026; G01L 19/0038;
(Continued)

(56) References Cited

U.S. PATENT DOCUMENTS 3,762,208 A * 10/1973 Bice ...................... G01L 9/0052
73/721
4,072,058 A * 2/1978 Whitehead, Jr. ...... G01L 9/0054
73/706
(Continued)

FOREIGN PATENT DOCUMENTS

CN    103292947 A    9/2013
JP    S6073427 A    4/1985

OTHER PUBLICATIONS

Matsuoka, et al., Design method for sensing body of differential pressure transmitter using silicon diaphragm-type pressure sensor. IEEE Transactions on Instrumentation and Measurement, 44(3), Jun. 1995.

*Primary Examiner* — Nimeshkumar D Patel
*Assistant Examiner* — Gedeon M Kidanu
(74) *Attorney, Agent, or Firm* — Mintz Levin Cohn Ferris Glovsky and Popeo, P.C.

(57) ABSTRACT

A pressure sensing package includes a sensor chamber and an annular chamber extending about the sensor chamber. A primary diaphragm divides the sensor chamber into a first part receiving a first pressure and a second part including a differential pressure sensor approximately centered with respect to a sensor axis and a first transmission fluid. The first transmission fluid transmits the first pressure to a first differential pressure sensor face. A secondary diaphragm divides the annular chamber into a first part receiving a second pressure and a second part including a second transmission fluid. The second pressure is transmitted to a second pressure sensor face via the secondary diaphragm and the second transmission fluid. The primary and secondary diaphragms are positioned with respect to one another along the sensor axis direction such that pressures other than the first and second pressures acting on the pressure sensor sum to approximately zero.

23 Claims, 11 Drawing Sheets

(58) Field of Classification Search
CPC ............ G01L 19/0046; G01L 19/0663; G01L 19/142; G01L 19/04; G01L 19/147; G01L 2009/0066; G01L 7/082; G01L 9/0072; G01L 9/0073
See application file for complete search history.

(56) References Cited

U.S. PATENT DOCUMENTS

| | | | | |
|---|---|---|---|---|
| 4,120,206 A * | 10/1978 | Rud, Jr. | ................ | G01L 9/0072 361/283.3 |
| 4,135,408 A * | 1/1979 | Di Giovanni | ......... | G01L 13/025 338/4 |
| 4,218,926 A * | 8/1980 | DeVisser | ................ | G01L 7/022 73/730 |
| 4,382,385 A | 5/1983 | Paros | | |
| 4,833,922 A * | 5/1989 | Frick | ................... | G01L 19/0038 73/706 |
| 5,157,972 A * | 10/1992 | Broden | ................. | G01L 9/0073 29/25.41 |
| 5,287,746 A * | 2/1994 | Broden | ................. | G01L 13/026 73/706 |
| 5,303,593 A * | 4/1994 | Kremidas | ............ | G01L 9/0051 338/4 |
| 5,684,253 A | 11/1997 | Bonne et al. | | |
| 6,295,875 B1 | 10/2001 | Frick et al. | | |
| 6,662,662 B1 | 12/2003 | Nord et al. | | |
| 7,624,642 B2 * | 12/2009 | Romo | ..................... | G01L 19/04 73/715 |
| 9,103,739 B2 * | 8/2015 | Broden | ............... | G01L 19/0645 |
| 9,588,003 B2 * | 3/2017 | Hedtke | ............... | G01L 19/0046 |
| 10,352,803 B2 * | 7/2019 | Tokuda | ................. | G01L 13/02 |
| 10,627,302 B2 * | 4/2020 | Strei | ....................... | G01L 19/04 |
| 2008/0253058 A1 * | 10/2008 | Chakraborty | ......... | G01L 9/0072 361/283.4 |
| 2014/0144243 A1 * | 5/2014 | Tanaka | ................. | G01L 13/025 73/716 |
| 2015/0082892 A1 * | 3/2015 | Hedtke | ............... | G01L 19/0046 73/706 |

* cited by examiner

FIG. 5

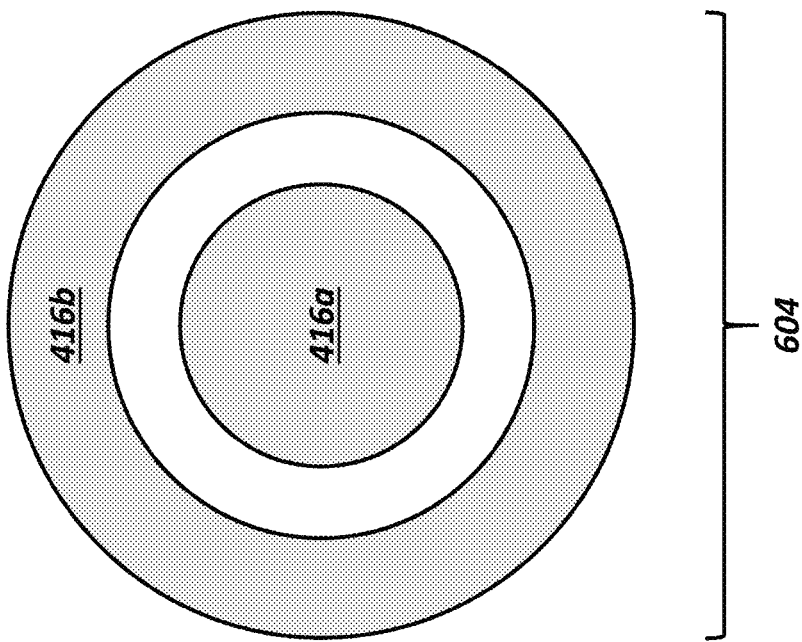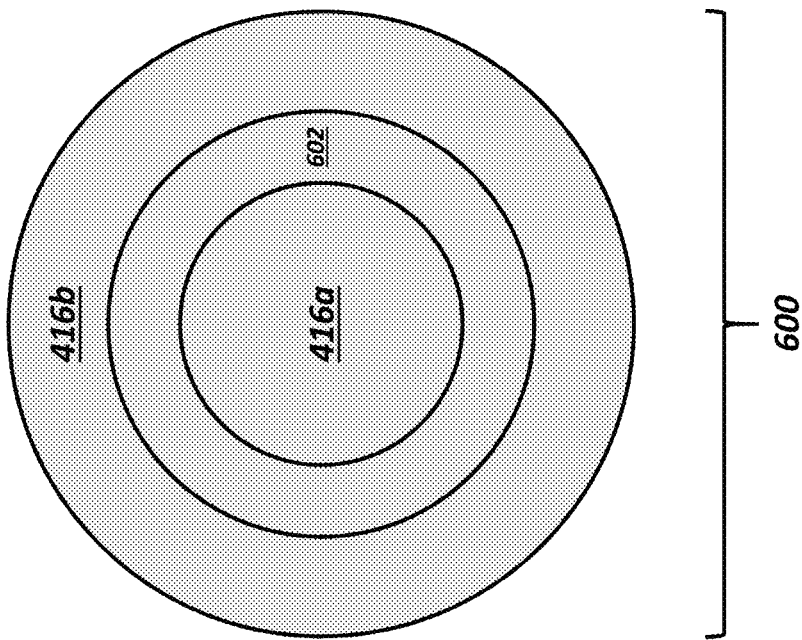

HIGH SENSITIVITY PRESSURE SENSOR PACKAGE

BACKGROUND

Fluids such as liquids and/or gases can be conveyed through pipes for transportation between locations. In order to control flow of the fluid within a network of pipes, pressure can be applied to the fluid and measured at a variety of locations. As an example, a pressure measurement can be performed by placing a pressure sensor in contact with the fluid.

Differential pressure sensors are a type of pressure sensor that can measure differences in pressure between two different inputs. As an example, a differential pressure can be measured between different locations of a fluid within a pipe network or between a fluid and a reference (e.g., atmosphere).

SUMMARY

Pressure sensors, such as differential pressure sensors, can be employed environments containing fluids (e.g., gases and/or liquids) that can cause damage to the pressure sensor. Examples of such fluids can include moisture (e.g., water and/or relatively humid air containing environments), corrosive gases, and chemicals. Accordingly, a pressure sensor can be isolated from damaging fluid environments for protection. As an example, a pressure sensor can be placed in an oil filled enclosure, separated from a damaging fluid by a diaphragm. Pressure exerted by the damaging fluid environment can be applied to the diaphragm and transmitted to the pressure sensing element via the oil. In this manner, the pressure from the damaging fluid environment can be transmitted to the pressure sensor while the pressure sensor is isolated from the damaging fluid.

However, this approach can be problematic with differential pressure sensors. A height of the oil protecting a differential pressure sensor, also referred to as a head, can exert a pressure on the differential pressure sensor due to the weight of the oil. This pressure can be added to the pressure exerted on one sensor face of the differential pressure sensor and can introduce error in measurement of differential pressure acquired by the differential pressure sensor.

In general, systems and methods are provided for overpressure protection of pressure sensors, such as differential pressure sensors.

In an embodiment, a pressure sensing package is provided and can include a body, a primary diaphragm, a secondary diaphragm, and a plurality of fluid passageways. The body can include a sensor chamber and an annular chamber extending about the sensor chamber. The sensor chamber and the annular chamber can be approximately centered with respect to a sensor axis. The primary diaphragm can be positioned within the sensor chamber and it can divide the sensor chamber into a first part and a second part. The first sensor chamber part can be configured to receive a first pressure via a first intake. The second sensor chamber part can include therein a differential pressure sensor approximately centered with respect to the sensor axis. The second sensor can also include therein a first transmission fluid. The first transmission fluid can be configured to transmit the first pressure to a first sensor face of the differential pressure sensor. The secondary diaphragm can be positioned within the annular chamber and it can divide the annular chamber into a first part and a second part. The first annular chamber part can be configured to receive a second pressure via a second intake. The second annular chamber part can include therein a second transmission fluid. The plurality of fluid passageways can be in fluid communication with the second annular chamber part and a second sensor face of the differential pressure sensor via the second transmission fluid. The second pressure can be is transmitted to the second sensor face via the secondary diaphragm and the second transmission fluid. The primary diaphragm and the secondary diaphragm can be positioned with respect to one another in the direction of the sensor axis such that a first transmission fluid pressure exerted upon the first sensor face of the differential pressure sensor due to a weight of the first transmission fluid is approximately equal in magnitude and opposite in direction to a second transmission fluid pressure exerted upon the second sensor face of the differential pressure sensor, opposite the first sensor face, due to a weight of the second transmission fluid.

In another embodiment, the first transmission fluid pressure and the second transmission fluid pressure can be approximately equal in magnitude and opposite in direction at any orientation of the differential pressure sensor with respect to a direction of acceleration.

In another embodiment, the sensor chamber and the primary diaphragm can be approximately circular.

Embodiments of the primary and secondary diaphragms can adopt a variety of configurations. In one aspect, the primary diaphragm and the secondary diaphragm can be portions of a single generally circular diaphragm. The primary diaphragm and the secondary diaphragm can be separated from one another by a fluid-tight seal interposed between the sensor chamber and the annular chamber. The primary diaphragm and the secondary diaphragm can also be approximately co-planar. In another aspect, the primary diaphragm and the secondary diaphragm can be formed as separate diaphragms. The primary diaphragm can possess an approximately circular shape and the secondary diaphragm can possess an approximately annular shape. The primary diaphragm and the secondary diaphragm can be approximately co-planar.

In another embodiment, a first diaphragm pressure, exerted upon the first sensor face of the differential pressure sensor due to a weight of the primary diaphragm, can be approximately equal in magnitude and opposite in direction to a second diaphragm pressure, exerted upon the second sensor face of the differential pressure sensor due to a weight of the secondary diaphragm. The primary diaphragm and the secondary diaphragm can be non co-planar.

In another embodiment, the first transmission fluid and the second transmission fluid can be approximately incompressible fluids.

In an embodiment, a method is provided. The method can include receiving, at a primary diaphragm of a differential pressure sensor package, a first fluid pressure exerted by a first fluid. The primary diaphragm can be positioned within a sensor chamber and it can divide the sensor chamber into a first sensor chamber part and a second sensor chamber part. The first sensor chamber part can be in fluid communication with the first fluid. The second sensor chamber part can include a differential pressure sensor and a first transmission therein. The differential pressure sensor can be approximately centered with respect to a sensor axis. The method can also include transmitting the first pressure to a first sensor face of the differential pressure sensor via the primary diaphragm and the first transmission fluid. The method can further include transmitting a first transmission fluid pressure due to a weight of the first transmission fluid to the first sensor face. The method can additionally include receiving, at a secondary diaphragm of the differential pressure sensor package, a second fluid pressure exerted by a second fluid. The secondary diaphragm can be positioned within an annular chamber. The annular chamber can extend about the sensor chamber. The secondary diaphragm can also divide the annular chamber into a first annular chamber part and a second annular chamber part. The first annular chamber part can be in fluid communication with the second fluid. The second annular chamber part can include a second transmission fluid therein. The second transmission fluid can be in fluid communication with a second sensor face of the differential pressure sensor. The method can also include transmitting the second pressure to the second sensor face of the differential pressure sensor via the secondary diaphragm and the second transmission fluid. The method can additionally include transmitting a second transmission fluid pressure due to a weight of the second transmission fluid to the second sensor face. The primary and secondary diaphragms can be approximately centered with respect to the sensor axis and positioned with respect to one another in the direction of the sensor axis. So configured, the first transmission fluid pressure can be approximately equal in magnitude and opposite in direction to the second transmission fluid pressure.

In another embodiment, the first transmission fluid pressure and the second transmission fluid pressure can be approximately equal in magnitude and opposite in direction at any orientation of the differential pressure sensor with respect to a direction of acceleration.

In another embodiment, the sensor chamber and the primary diaphragm can be approximately circular.

Embodiments of the primary and secondary diaphragms can adopt a variety of configurations. In one aspect, the primary diaphragm and the secondary diaphragm can be portions of a single generally circular diaphragm. The primary diaphragm and the secondary diaphragm can be separated from one another by a fluid-tight seal interposed between the sensor chamber and the annular chamber. The primary diaphragm and the secondary diaphragm can also be approximately co-planar. In another aspect, the primary diaphragm and the secondary diaphragm can be formed as separate diaphragms. The primary diaphragm can possess an approximately circular shape and the secondary diaphragm can possess an approximately annular shape. The primary diaphragm and the secondary diaphragm can be approximately co-planar.

In another embodiment, a first diaphragm pressure, exerted upon the first sensor face of the differential pressure sensor due to a weight of the primary diaphragm, can be approximately equal in magnitude and opposite in direction to a second diaphragm pressure, exerted upon the second sensor face of the differential pressure sensor due to a weight of the secondary diaphragm. The primary diaphragm and the secondary diaphragm can be non co-planar.

DESCRIPTION OF DRAWINGS

These and other features will be more readily understood from the following detailed description taken in conjunction with the accompanying drawings, in which:

FIG. 5 is a side cross-sectional view illustrating the fully balanced sensor package of FIG. 4 rotated by approximately 90°;

FIG. 6A is a schematic illustration of one exemplary embodiment of primary and secondary diaphragms of the fully balanced sensor package of FIG. 4;

FIG. 6B is a schematic illustration of another exemplary embodiment of primary and secondary diaphragms of the fully balanced sensor package of FIG. 4;

It is noted that the drawings are not necessarily to scale. The drawings are intended to depict only typical aspects of the subject matter disclosed herein, and therefore should not be considered as limiting the scope of the disclosure.

DETAILED DESCRIPTION

Differential pressure sensors are devices that can measure a difference between two pressures, and can be used in a variety of applications. In one aspect, differential pressure sensors can be used to measure pressure drops across filters, such as air filters in HVAC systems and oil filters in engines. In another aspect, differential pressure sensors can be used to measure fluid levels in tanks and other fluid containing vessels. In a further aspect, differential pressure sensors can be used to measure flow rates of fluids (e.g., gases, liquids) in pipes.

Differential pressure sensors can use a pressure sensing element to measure a difference between two different pressures. The differential pressure sensor can direct the two pressures, transmitted by fluids (e.g., gases and/or liquids), to opposite opposed sides of the pressure sensing element. The pressure sensing element can output signals representing measurements of the difference between the two fluid pressures. To protect the pressure sensing element under circumstances where one or both of the two pressures are transmitted by fluids that can damage the pressure sensing element (e.g., corrosive fluids), at least one side of the pressure sensing element can be separated from the damaging fluid by an isolating diaphragm. Pressure exerted by the damaging environment can be transmitted to the pressure sensing element by the diaphragm and a transmission fluid interposed between the diaphragm and the pressure sensing element. However, a weight of the transmission fluid and/or the weight of the diaphragm can also be transmitted to the pressure sensing element, which can introduce error in differential pressure measurements made by the differential pressure sensor. Furthermore, this error can change based upon an orientation of the pressure sensing element with respect to an applied acceleration (e.g., vibration, gravity, etc.). Accordingly, a differential pressure sensor package is provided that approximately balances pressures exerted on the pressure sensing element, other than the first and second pressures (e.g., weight of the transmission fluid and/or the weight of the diaphragm), regardless of the orientation of the pressure sensing element. In this manner, high accuracy measurements of differential pressure can be acquired at any orientation of the sensor package. Furthermore, correction of the orientation of the sensor package after installation to maintain high accuracy of differential pressure measurements can be eliminated.

Figure 1:
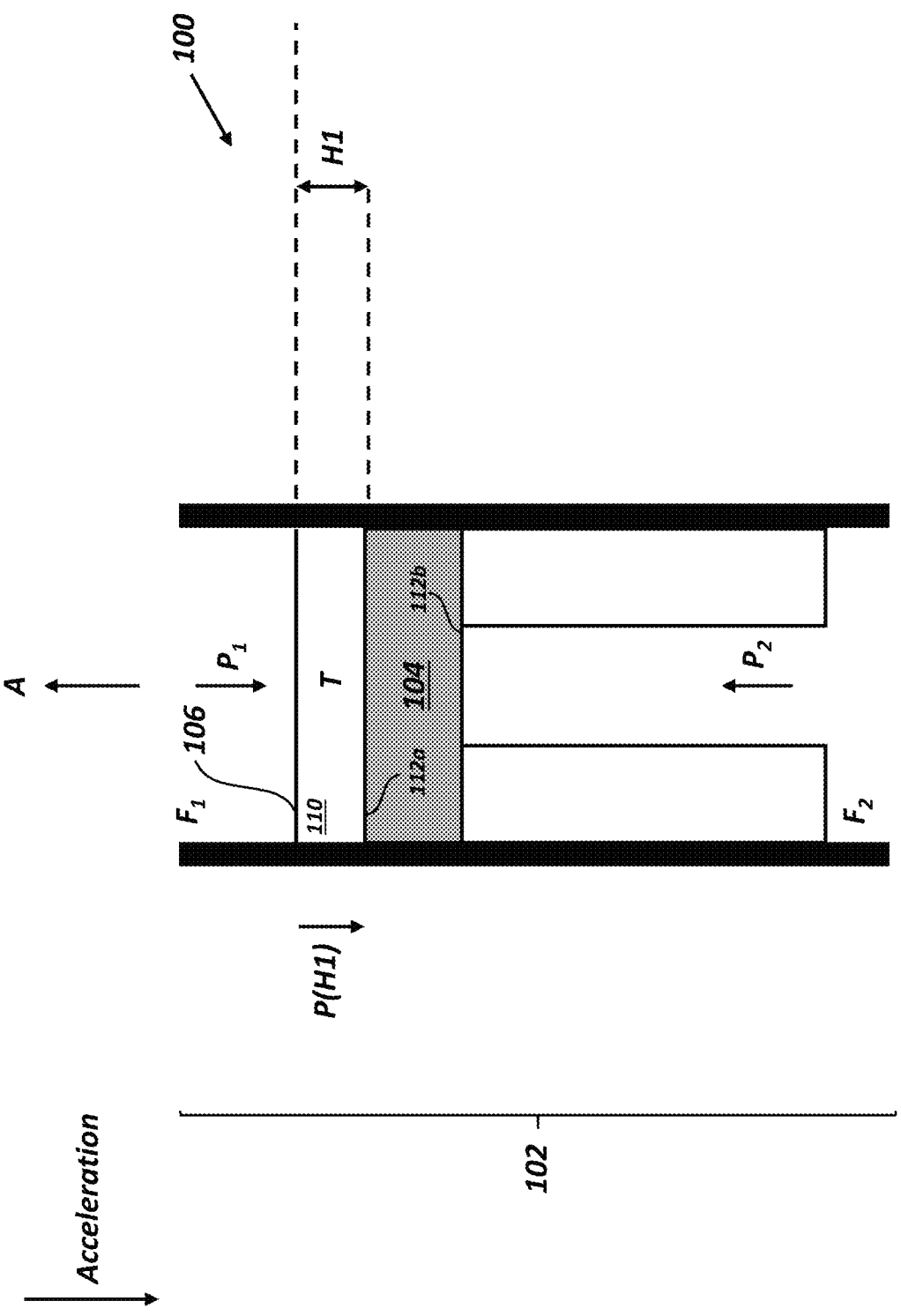
FIG. 1 is side cross-sectional view illustrating an unbalanced sensor package including a differential pressure sensor.

As an example, FIG. 1 illustrates an operating environment 100 including an unbalanced sensor package 102 in fluid communication with a first pressure $P_1$ exerted by a first fluid $F_1$ and a second pressure $P_2$ exerted by a second fluid $F_2$. The unbalanced sensor package 102 can include a differential pressure sensor 104, a diaphragm 106, and a transmission fluid T (e.g., an approximately incompressible fluid) filling a cavity 110 defined between a first sensor face 112a of the differential pressure sensor 104 (e.g., an upper face) and the diaphragm 106. A sensor axis A can be aligned (e.g., approximately parallel) to an acceleration direction (e.g., gravity, vibration, etc.).

Deformation of the diaphragm 106 can transmit the pressure $P_1$ to the differential pressure sensor 104 via the transmission fluid T. The pressure $P_2$ can be applied directly to a second sensor face 112b of the differential pressure sensor, opposite the first sensor face 112a. In this manner, the differential pressure sensor 104 can measure a differential pressure between pressures $P_1$ and $P_2$ while isolating the differential pressure sensor 104 from the first, damaging fluid $F_1$.

However, this approach can be problematic. A height H1 of the transmission fluid T, also referred to as a head, can exert a hydrostatic pressure on the first sensor face 112a of the differential pressure sensor 104 due to the weight of the transmission fluid T. In general, hydrostatic pressure can be given by Pascal's Law, which relates a change in pressure ΔP between two points in a fluid column separated by a height ΔH $$\Delta P = \rho g (\Delta H)$$

where ρ is the density of the fluid (e.g., the transmission fluid T) and g is the acceleration due to gravity (e.g., approximately 9.81 m/s² near the surface of the earth). In the instant example, the height ΔH is the height H1 of the column of the transmission fluid T and the acceleration due to gravity g is assumed in a downward direction. Thus, the transmission fluid T exerts a pressure P(H1) in the downward direction. This hydrostatic pressure P(H1) can be added to the pressure $P_1$ exerted on the first sensor face 112a of the differential pressure sensor 104 (e.g., an upper face) and can introduce error in measurement of differential pressure acquired by the differential pressure sensor 104.

Figure 2:
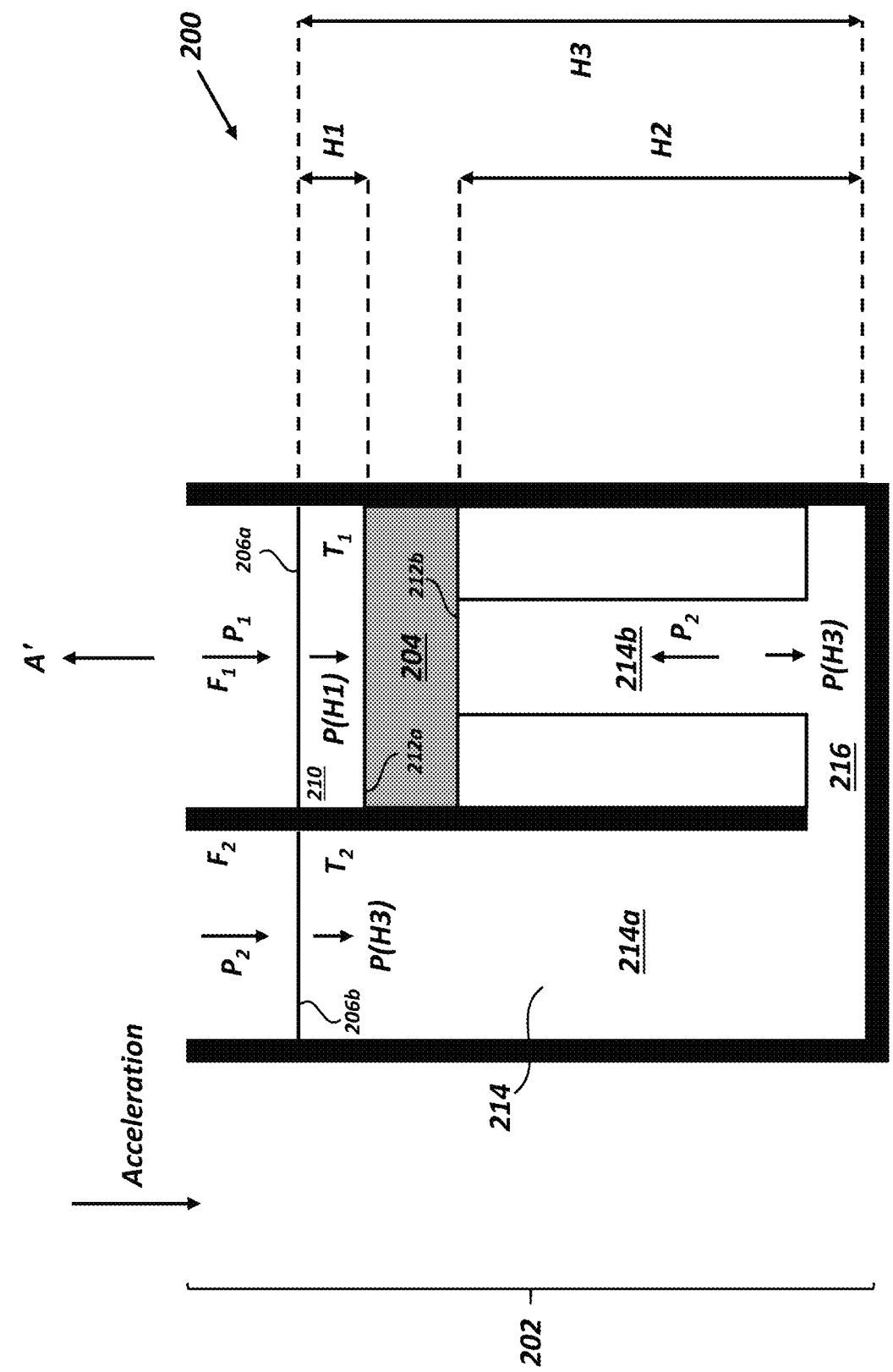
FIG. 2 is a side cross-sectional view illustrating a partially balanced sensor package including a differential pressure sensor.

To address this concern, sensor packages have been developed which attempt to offset the weight of the column of transmission fluid. As an example, FIG. 2 illustrates an operating environment 200 including a partially balanced sensor package 202 in fluid communication with a first pressure $P_1$ exerted by a first, damaging fluid $F_1$ and a second pressure $P_2$ exerted by a second fluid $F_2$. As shown, the partially balanced sensor package 202 includes a differential pressure sensor 204, a first diaphragm 206a, a second diaphragm 206b, a first transmission fluid $T_1$, and a second transmission fluid $T_2$. The first transmission fluid $T_1$ can approximately fill a first cavity 210 defined between a first sensor face 212a of the differential pressure sensor 204 (e.g., an upper face) and the first diaphragm 206a. The second transmission fluid $T_2$ can fill a second cavity 214 defined between a second sensor face 212b of the differential pressure sensor 204 (e.g., a lower face) and the second diaphragm 206b. The first pressure $P_1$ can be applied to the first sensor face 212a via the first transmission fluid $T_1$ and the second pressure $P_2$ can be applied to the second sensor face 212b via the second transmission fluid $T_2$.

A sensor axis A can be aligned (e.g., approximately parallel) to an acceleration direction (e.g., gravity, vibration, etc.). As shown, the acceleration points in a downward direction. So oriented, the first transmission fluid $T_1$ can exert pressure P(H1) on the first sensor face 212a of the differential pressure sensor 204 due to the height H1 of the first transmission fluid $T_1$. However, in contrast to the unbalanced sensor package 102, the pressure P(H1) in the partially balanced sensor package 202 can be opposed by a pressure of approximately equal magnitude and opposite direction exerted by the second transmission fluid $T_2$.

As shown, the second cavity 214 includes two columns, 214a, 214b in fluid communication by a passage 216. The second transmission fluid $T_2$ within the first column 214a can possesses a height H3, extending from the second diaphragm 206b to a bottom of the passage 216, and exert a pressure P(H3). The second transmission fluid $T_2$ within the second column 214b can possesses a height H2, extending from the second sensor face 212b to the bottom of the passage 216, and exert a pressure P(H2) which opposes P(H3). It can be understood that a height of the differential pressure sensor 204 is exaggerated in FIG. 2 and can be considered negligible compared to H1, H2, and H3. Thus, H3 can be approximately equal to the sum of H1 and H2. Accordingly, a net pressure exerted by the second transmission fluid $T_2$ on the second sensor face 212b is the difference P(H3)–P(H2), which is equal to P(H1).

Figure 3:
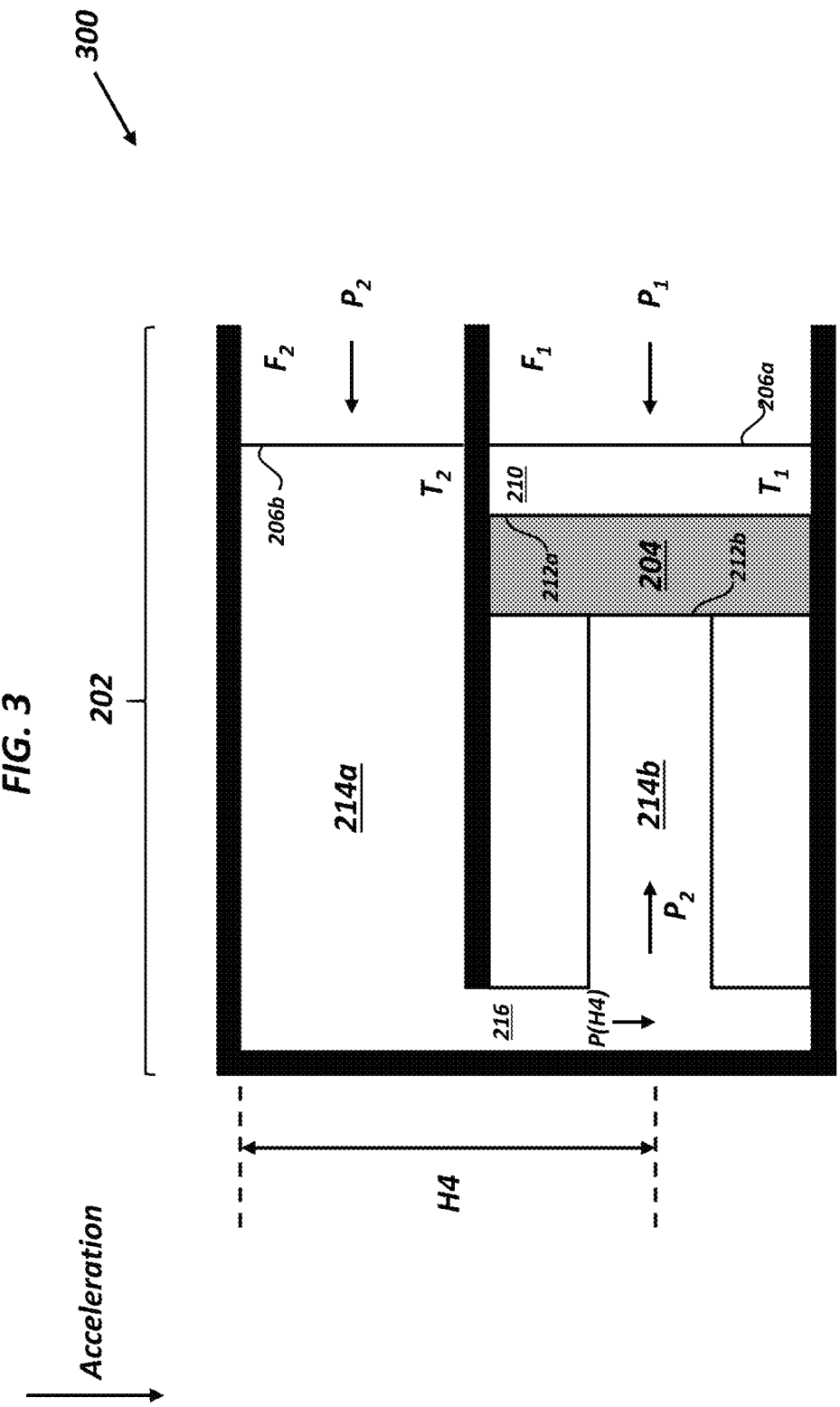
FIG. 3 is a side cross-sectional view illustrating the partially balanced sensor package of FIG. 2 rotated by approximately 90°.

However, the partially balanced sensor package 202 can be incapable of compensating for errors in differential pressure sensing measurements due to the weight of the first and second transmission fluids $T_1$, $T_2$ when placed in other orientations. FIG. 3 illustrates the partially balanced sensor package 202 rotated approximately 90° as compared to its orientation of FIG. 2, with the acceleration due to gravity g remaining in the downward direction. In this orientation, a height of the second transmission fluid $T_2$ is H4. It can be understood that a width of the differential pressure sensor 204 is exaggerated in FIG. 3 and can be considered negligible compared to H4. Thus, a height of the first transmission fluid $T_1$ is approximately zero and the height H4 of the second transmission fluid $T_2$ can extend from an upper surface 300 of the second cavity 214 to any location along the width of the differential pressure sensor 204 (e.g., a midpoint of the width of the differential pressure sensor 204). Consequently, the second transmission fluid $T_2$ can exert a pressure P(H4) on the second sensor face 212b and the first transmission fluid $T_1$ can exert approximately no pressure on the first sensor face 212a. That is, the pressure exerted by the second transmission fluid $T_2$ is not balanced by the pressure exerted by the first transmission fluid $T_1$.

Figure 4:
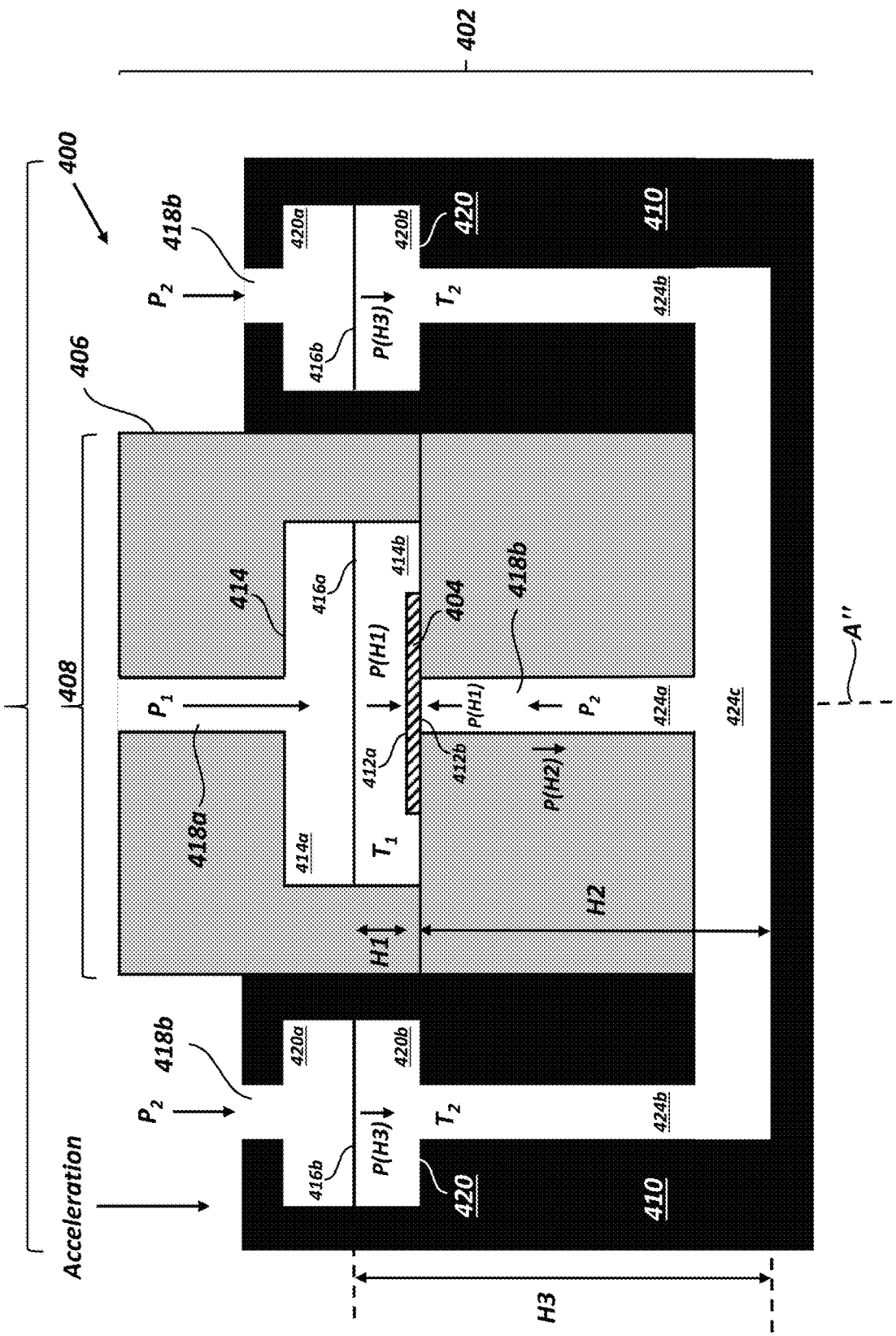
FIG. 4 is a side cross-sectional view illustrating one exemplary embodiment of a fully balanced sensor package including a differential pressure sensor.

FIG. 4 is a schematic diagram illustrating one exemplary embodiment of an operating environment 400 including a balanced pressure sensor package 402, a first fluid $F_1$ at a first pressure $P_1$ and a second fluid $F_2$ at a second pressure $P_2$. The balanced pressure sensor package 402 can include a differential pressure sensor 404 configured for fluid communication with the first pressure $P_1$ exerted by the first fluid $F_1$ via a first transmission fluid $T_1$ and the second pressure $P_2$ exerted by the second fluid $F_2$ via a second transmission fluid $T_2$. In certain embodiments, at least one of the first and second fluids $F_1$, $F_2$ can be a fluid capable of causing damage (e.g., corrosion) to the differential pressure sensor 404. Use of the first transmission fluid $T_1$ and the second transmission fluid $T_2$ for transmission of pressure to the differential pressure sensor 404 can protect the differential pressure sensor 404 from such damage.

As shown, the balanced pressure sensor package 402 can include a body 409 having a central portion 406 and an annular portion 410, and a plurality of fluid passageways (e.g., 424a, 424b, 424c) extending therebetween. In certain embodiments, the annular portion 410 can define a central channel 408 and the central portion 406 can be received within the central channel 408. The central channel 408 and the annular portion 410 can be approximately centered with respect to a sensor axis A of the differential pressure sensor 404. In an alternative embodiment, the balanced pressure sensor package can omit the central portion and the annular portion. As discussed in detail below in regards to FIGS. 8A-8C, the balanced pressure sensor package 402 can be in the form of balanced pressure sensor package 802 that includes a body 804 formed in two halves 804a, 804b, with a diaphragm 816 interposed therebetween.

The central portion 406 of the balanced pressure sensor package 402 can defining a sensor chamber 414 therein. The sensor chamber 414 can be divided by a primary diaphragm 416a into a first part 414a and a second part 414b. The first sensor chamber part 414a can be configured to receive the first pressure $P_1$. As an example, the first sensor chamber part 414a can be configured to receive the first pressure $P_1$ via a first intake 418a in fluid communication with the first fluid $F_1$. The differential pressure sensor 404 and a first transmission fluid $T_1$ can be positioned within the second sensor chamber part 414b. So configured, the first transmission fluid $T_1$ and the primary diaphragm 416a can protect the differential pressure sensor 404 from direct contact with the first fluid $F_1$, while facilitating transmission of the first pressure $P_1$ to a first sensor face 412a of the differential pressure sensor 404. As discussed in greater detail below, the balanced pressure sensor package 402 can be configured such that a second sensor face 412b of the differential pressure sensor 404 receives the second pressure $P_2$ from one of the plurality of fluid passageways.

The annular portion 410 can include an annular chamber 420. The annular chamber 420 can be divided by a secondary diaphragm 416b into a first part 420a and a second part 420b. The first annular chamber part 420a can be configured to receive the second pressure $P_2$. As an example, the first annular chamber part 420a can receive the second pressure $P_2$ via a second intake 418b in fluid communication with the second fluid $F_2$.

The plurality of fluid passageways 424a, 424b, 424c can be in fluid communication with the secondary diaphragm 416b and the second sensor face 412b of the differential pressure sensor 404 via the second transmission fluid $T_2$. As shown, a first fluid passageway 424a can be positioned within the central portion 406 and extend from the sensor chamber 414 (e.g., from the second sensor chamber part 414b). A second fluid passageway 424b can be positioned within the annular portion 410 and extend from the annular chamber 420 (e.g., from the second annular chamber part 420b). A third fluid passageway 424c can extend between the first and second fluid passageways 424a, 424b.

In use, the first pressure $P_1$ can be received by the first intake 418a and the second pressure $P_2$ can be received by the second intake 418b. The first pressure $P_1$ can be applied to the first sensor face 412a of the differential pressure sensor 404 via the primary diaphragm 416a and the first transmission fluid $T_1$. The second pressure $P_2$ can be applied to the second sensor face 412b of the differential pressure sensor 404 via the secondary diaphragm 416b and the second transmission fluid $T_2$ using the plurality of fluid passageways 424a, 424b, 424c.

As discussed below, the balanced pressure sensor package 402 can be configured such that a first transmission fluid pressure applied to the first sensor face 412a of the differential pressure sensor 404 due to a weight of the first transmission fluid $T_1$ is approximately balanced by a second transmission fluid pressure applied to the second sensor face 412b of the differential pressure sensor 404 due to a weight of the second transmission fluid $T_2$. That is, the weight of the first transmission fluid $T_1$ can be approximately canceled by the weight of the second transmission fluid $T_2$, regardless of the orientation of the balanced pressure sensor package 402. In this manner, high accuracy measurements of differential pressure can be acquired by the differential pressure sensor 404 at any orientation with respect to a direction of an acceleration (e.g., gravity, vibration, etc.), rather than only certain orientations, as compared to the partially balanced sensor package 202 discussed above.

Embodiments of the central portion 406 and the sensor chamber 414 can adopt a variety of configurations. As shown, each of the central portion 406 and the sensor chamber 414 can be formed in approximately circular shapes. The central portion 406 and the sensor chamber 414 can also be approximately centered with respect to the sensor axis A.

In certain embodiments, the central portion can be formed as a single piece. In other embodiments, the central portion can be formed in multiple pieces. In multiple piece configurations, the sensor chamber can be formed within a single piece of the central portion or partially formed within multiple, abutting pieces of the central portion. The pieces of the central portion can be secured to one another by one or more fluid-tight seals.

The primary diaphragm 416a can be positioned within, and span a width of, the sensor chamber 414. So positioned, the primary diaphragm 416a can divide the sensor chamber 414 into the first sensor chamber part 414a and the second sensor chamber part 414b. The first sensor chamber part 414a can be configured to receive the first pressure $P_1$ from the first intake 418a and the second sensor face 412b of the differential pressure sensor 404 can be configured to receive the second pressure $P_2$ from the plurality of fluid passageways 424a, 424b, 424c via the second intake 418b.

The differential pressure sensor 404 can be positioned within the second part 414b of the sensor chamber 414. As shown, the first sensor face 412a of the differential pressure sensor 404 can face the primary diaphragm 416a and the second sensor face 412b of the differential pressure sensor 404 can face the fluid passageway 424a. In certain embodiments, the first transmission fluid $T_1$ can substantially fill the second sensor chamber part 414b. That is, the second sensor chamber part 414b filled with the first transmission fluid $T_1$ can be substantially free of voids. So configured, the first pressure $P_1$ received by the first sensor chamber part 414a can be transmitted to the first sensor face 404a of the differential pressure sensor 404 by the primary diaphragm 416a and the first transmission fluid $T_1$.

The secondary diaphragm 416b can be positioned within, and span a width of, the annular chamber 420. So positioned, the secondary diaphragm 416b can divide the annular chamber 420 into the first annular chamber part 420a and the second annular chamber part 420b. The first annular chamber part 420a can be configured to receive the second pressure $P_2$ from the second intake 418b. In certain embodiments, the second transmission fluid $T_2$ can substantially fill the second annular chamber part 420b and the plurality of fluid passageways 424a, 424b, 424c. That is, the second annular chamber part 420b and the plurality of fluid passageways 424a, 424b, 424c filled with the second transmission fluid $T_2$ can be substantially free of voids. So configured, the second pressure $P_2$ received by the first annular chamber part 420a can be transmitted to the second sensor face 412b of the differential pressure sensor 404 by the secondary diaphragm 416b and the second transmission fluid $T_2$.

The first transmission fluid $T_1$ and the second transmission fluid $T_2$ can be any substantially incompressible fluid. Examples of incompressible fluids can include, but are not limited to, gels, oils (e.g., silicone oil, mineral oil, etc.), monoethylene glycol, and the like. In certain embodiments, the first transmission fluid $T_1$ and the second transmission fluid $T_2$ can be formed from the same fluid. In other embodiments, the first transmission fluid $T_1$ and the second transmission fluid $T_2$ can be formed from different fluids having approximately equal densities.

As shown in FIG. 4, the first transmission fluid $T_1$ can possess a height H1 above the differential pressure sensor 404. The height H1 can extend from the first sensor face 412a of the differential pressure sensor 404 (e.g., an upper face) to the primary diaphragm 406a (e.g., a lower face). When the balanced pressure sensor package 402 is oriented such that the acceleration due to gravity g is in a downward direction, the first transmission fluid $T_1$ can exert pressure P(H1) in a downward direction on the first sensor face 412a of the differential pressure sensor 404 due to the weight of the first transmission fluid $T_1$.

The pressure P(H1) exerted by the first transmission fluid $T_1$ can be opposed by a pressure of approximately equal magnitude and opposite direction exerted by the second transmission fluid $T_2$. As shown, the second transmission fluid $T_2$ within each of the first and second fluid passageways 424a, 424b can possess a height H3, extending from the second diaphragm 206b (e.g., a lower surface) to a bottom of the third fluid passageway 424c, and exert a pressure P(H3). The second transmission fluid $T_2$ within the first fluid passageway 424a can possess a height H2, extending from the second sensor face 412b of the differential pressure sensor 404 to the bottom of the third fluid passageway 424c, and exert a pressure P(H2) opposing P(H3).

In certain embodiments, a height of the differential pressure sensor can be considered negligible compared to the heights H1, H2, and H3. Thus, the height H3 can be approximately equal to the sum of the heights H1 and H2, as illustrated in FIG. 4. Accordingly, a net pressure exerted by the second transmission fluid $T_2$ on the second sensor face 212b is the difference P(H3)–P(H2), which is equal to P(H1).

In other embodiments, where the thickness of the differential pressure sensor cannot be considered negligible compared to the heights H1, H2, and H3, the height H3 can be different from the sum of the heights H1 and H2. Under these circumstances, the thickness of the differential pressure sensor can be corrected for by lowering the position of the secondary diaphragm with respect to the primary diaphragm 416a by an amount approximately equal to the thickness of the differential pressure sensor. In this manner, the height H3 can be adjusted so as to be approximately equal to the heights H1 and H2.

In contrast to the partially balanced sensor package 202, the pressure applied to the differential pressure sensor 404 due to the weight of the first transmission fluid $T_1$ (e.g., P(H1)) can be balanced by the pressure applied to the differential pressure sensor 404 due to the weight of the second transmission fluid $T_2$ when rotated in orientations other than that illustrated in FIG. 4.

Figure 5:
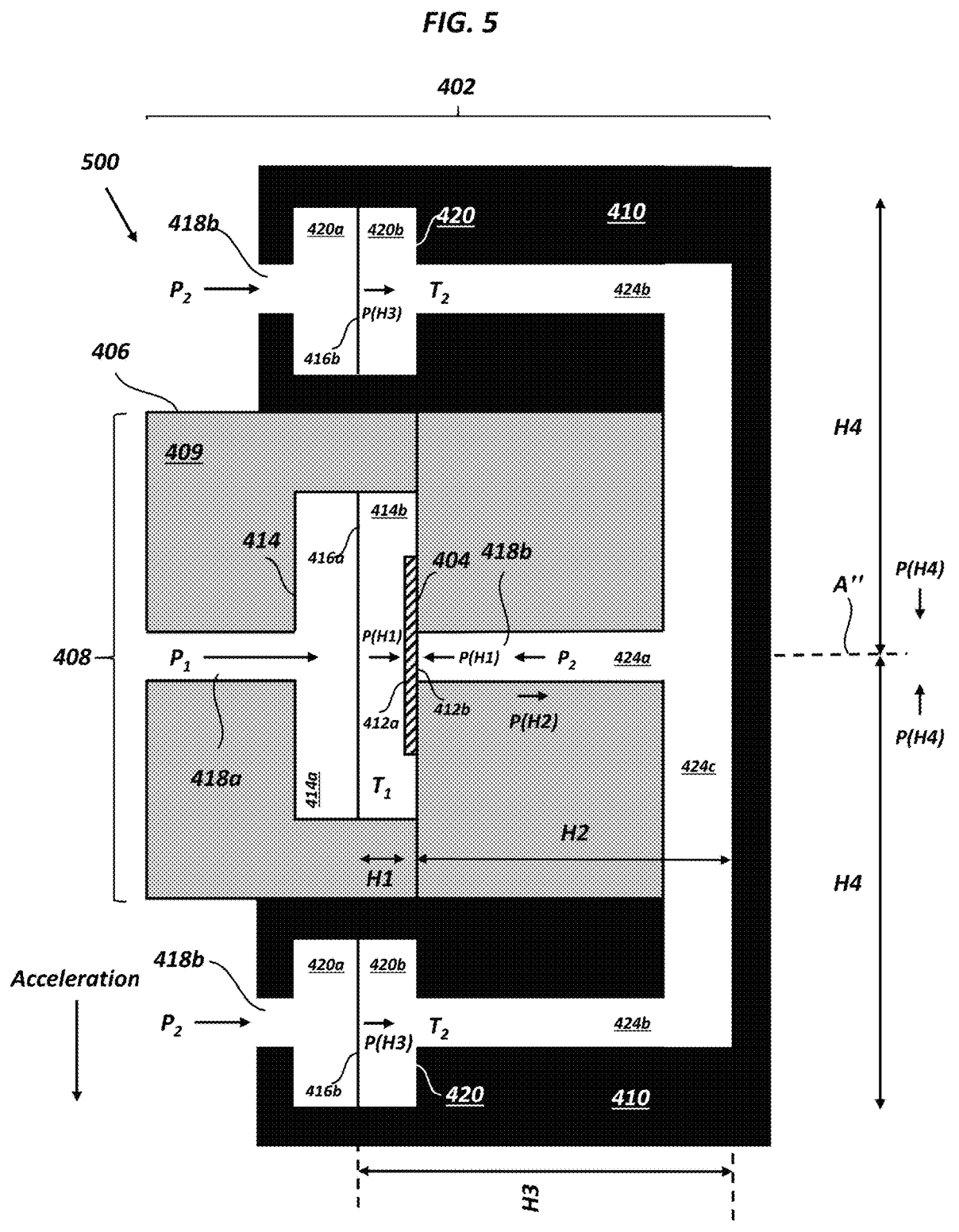

As an example, FIG. 5 illustrates an operating environment 500 in which the balanced pressure sensor package 402 is rotated approximately 90° as compared to its orientation of FIG. 4, with the acceleration due to gravity g remaining in the downward direction. As shown, the annular chamber 420 possesses an outer circumference at a predetermined radius H4 with respect to the sensor axis A". The differential pressure sensor 404 is further centered at about the sensor axis A". It can be understood that a width of the differential pressure sensor 404 (e.g., the extent of the differential pressure sensor in the vertical direction) is exaggerated in FIG. 5 and can be considered negligible compared to H4. Thus, a height of the first transmission fluid $T_1$ above the differential pressure sensor 404 can be considered to be zero. Accordingly, pressure exerted by the weight of the first transmission fluid $T_1$ on the first sensor face 412a of the differential pressure sensor 404 can be ignored. A height H4 of the second transmission fluid $T_2$ both above and below the differential pressure sensor 440 can extend from the sensor axis A" to the outer radius of the annular chamber 420. Consequently, these pressures exerted by the second transmission fluid $T_2$ balance one another and do not introduce error in measurements of the differential pressure between the first pressure $P_1$ and the second pressure $P_2$.

The primary diaphragm 416a and the secondary diaphragm 416b can have a variety of configurations. In general, the primary diaphragm 416a and the secondary diaphragm 416b can be formed from materials that do not degrade in contact with any of the first fluid $F_1$, the second fluid $F_2$, the first transmission fluid $T_1$, and the second transmission fluid $T_2$. The materials forming the primary diaphragm 416a and the secondary diaphragm 416b can be configured to undergo fully reversible deformation (e.g., elastic deformation) under applied forces/pressures in service.

In one embodiment, illustrated in FIG. 6A, the primary diaphragm 416a and the secondary diaphragm 416b can be in the form of a single diaphragm 600. The primary diaphragm 416a can form a center portion of the single diaphragm 600 having a generally circular shape, while the secondary diaphragm 416b can form an outer portion of the single diaphragm 600 having a generally annular shape. As shown, the single diaphragm 600 can include a spacer 602 interposed between the primary diaphragm 416a and the secondary diaphragm 416b. The single diaphragm 600 can be approximately planar. The spacer 602 can be dimensioned to span a distance between an outer circumference of the sensor chamber 414 and an inner circumference of the annular chamber 420.

In another embodiment, illustrated in FIG. 6B, the primary diaphragm 416a and the secondary diaphragm 416b can be in the form of separate diaphragms 604. In either case, as discussed above, the primary diaphragm 416a can be dimensioned to span the sensor chamber 414 and the secondary diaphragm 416b can be dimensioned to span the annular chamber 420.

Figure 7:
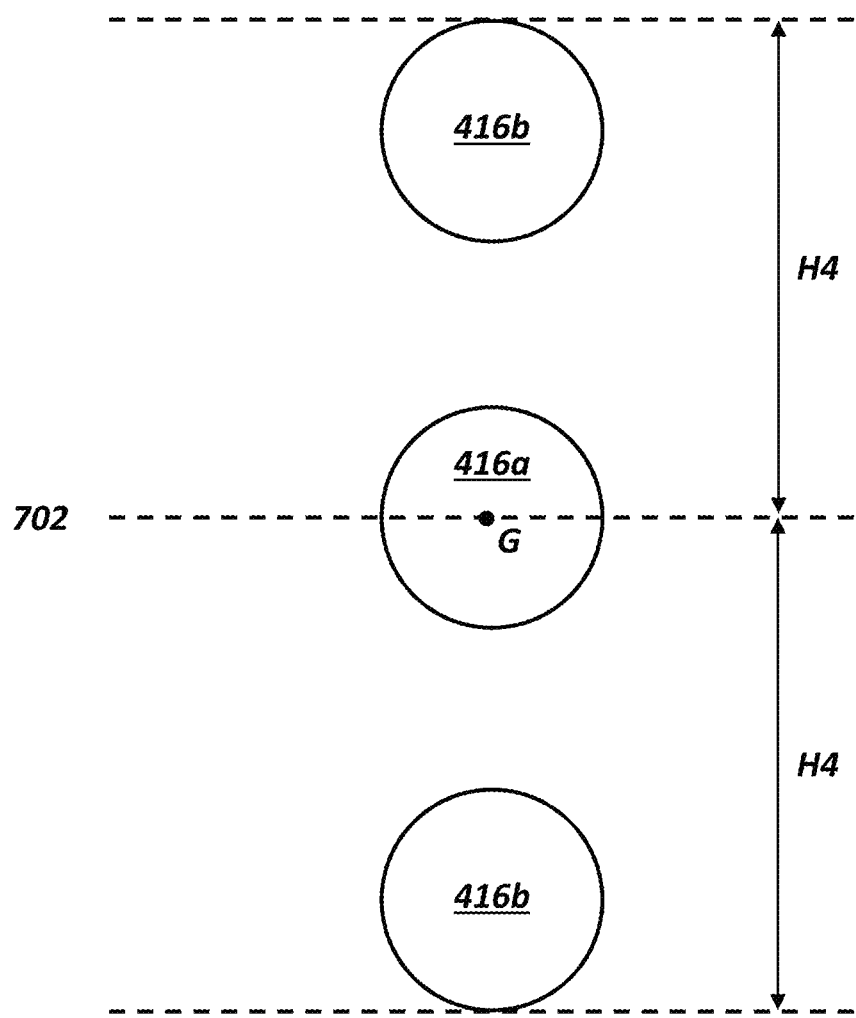
FIG. 7 is a schematic illustration of another exemplary embodiment of primary and secondary diaphragms of the fully balanced sensor package of FIG. 4.

In a further embodiment, illustrated in FIG. 7, the primary diaphragm 416a and the secondary diaphragm 416b can also be in the form of a plurality of separate diaphragms 700. However, in contrast to the embodiment of FIG. 6B, the secondary diaphragms 416b are provided in pairs having the same symmetric shape and positioned symmetrically with respect to the primary diaphragm 416a (e.g., about an axis of symmetry 702 extending through a geometric center G of the primary diaphragm 416a). In this manner, each member of each pair of secondary diaphragms 416b are positioned at the same distance H4 with respect to the axis of symmetry 702 of the primary diaphragm 416a. As shown, each of the primary and secondary diaphragms 416a, 416b adopts a circular shape. However, other shapes with even symmetry are possible, such as square, rectangle, hexagon, octagon, etc.

In use, the primary diaphragm 416a can be placed in fluid communication with the first sensor face 412a of the differential pressure sensor 404. The plurality of secondary diaphragms 416b can also be placed in fluid communication with the second sensor face 412b of the differential pressure sensor 404. In the configuration of FIGS. 4 and 5, the height H1 of the first transmission fluid $T_1$ can be substantially balanced (e.g., within about 0.1 mm or less) to the height H3-H2 of the second transmission fluid $T_2$. As discussed above, pressure applied to the differential pressure sensor 404 due to the weight of the primary diaphragm 416a and/or the weight of the secondary diaphragm 416b has been considered to be negligible with respect to the weight of the first transmission fluid $T_1$ and the weight of the second transmission fluid $T_2$ and ignored. However, it can be understood that, in alternative embodiments, this condition is not satisfied. That is, the pressure applied to the differential pressure sensor 404 due to the weight of the primary diaphragm 416a and/or the weight of the secondary diaphragm 416b can be non-negligible with respect to pressure applied to the differential pressure sensor 404 due to the weight of the first transmission fluid $T_1$ and/or the weight of the second transmission fluid $T_2$, Under this circumstance, the position of the secondary diaphragm 416b can be moved with respect to the position of the primary diaphragm 416a along the direction of the sensor axis A" in order to adjust any one or more of the heights H1, H2, and H3 and compensate. Accordingly, in certain embodiments, the primary diaphragm 416a and the secondary diaphragm 416b can be offset from one another and do not lie in the same plane with respect to one another.

Figure 8A:
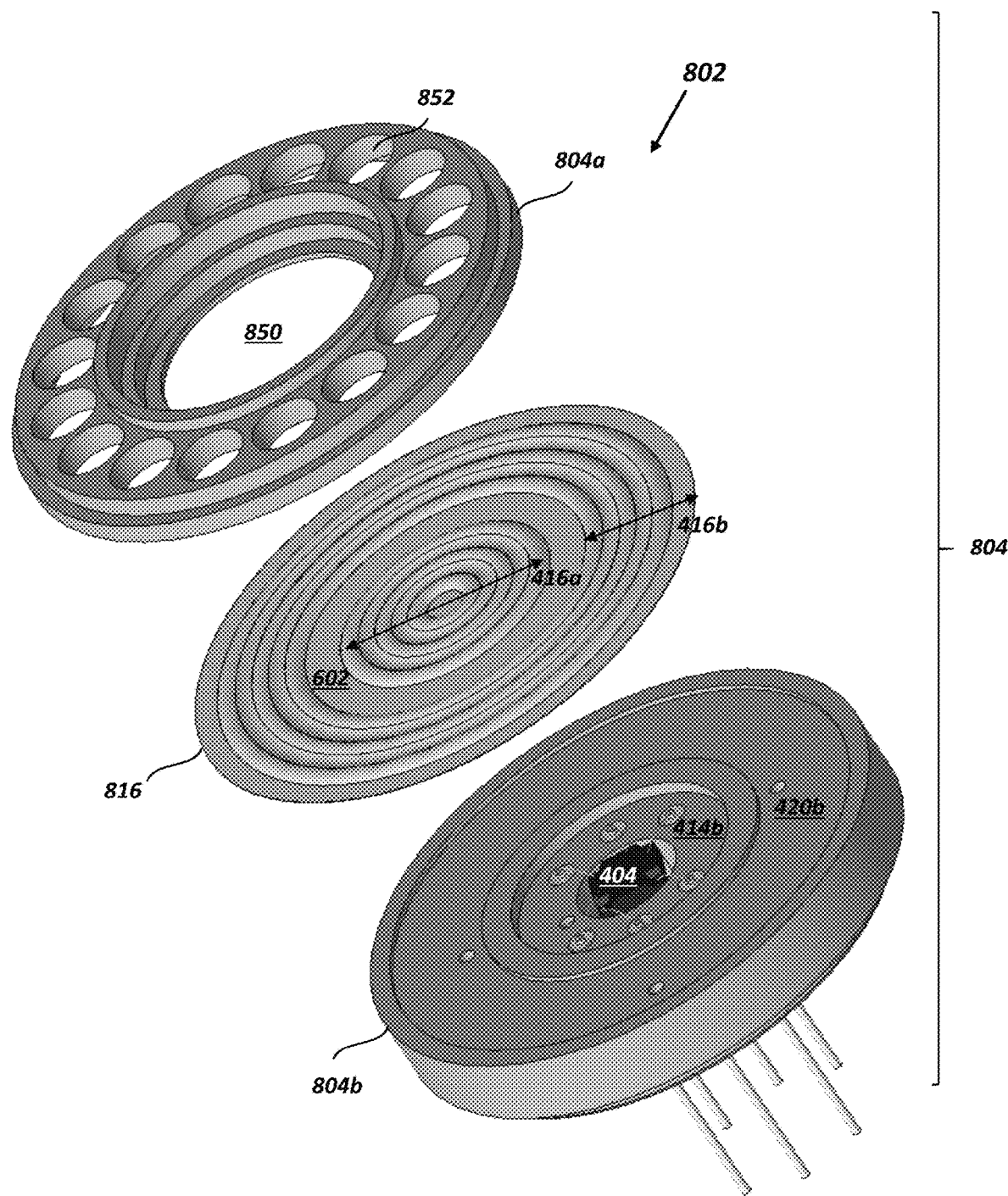
FIG. 8A is an exploded, isometric view illustrating another exemplary embodiment of a fully balanced sensor package.
Figure 8B:
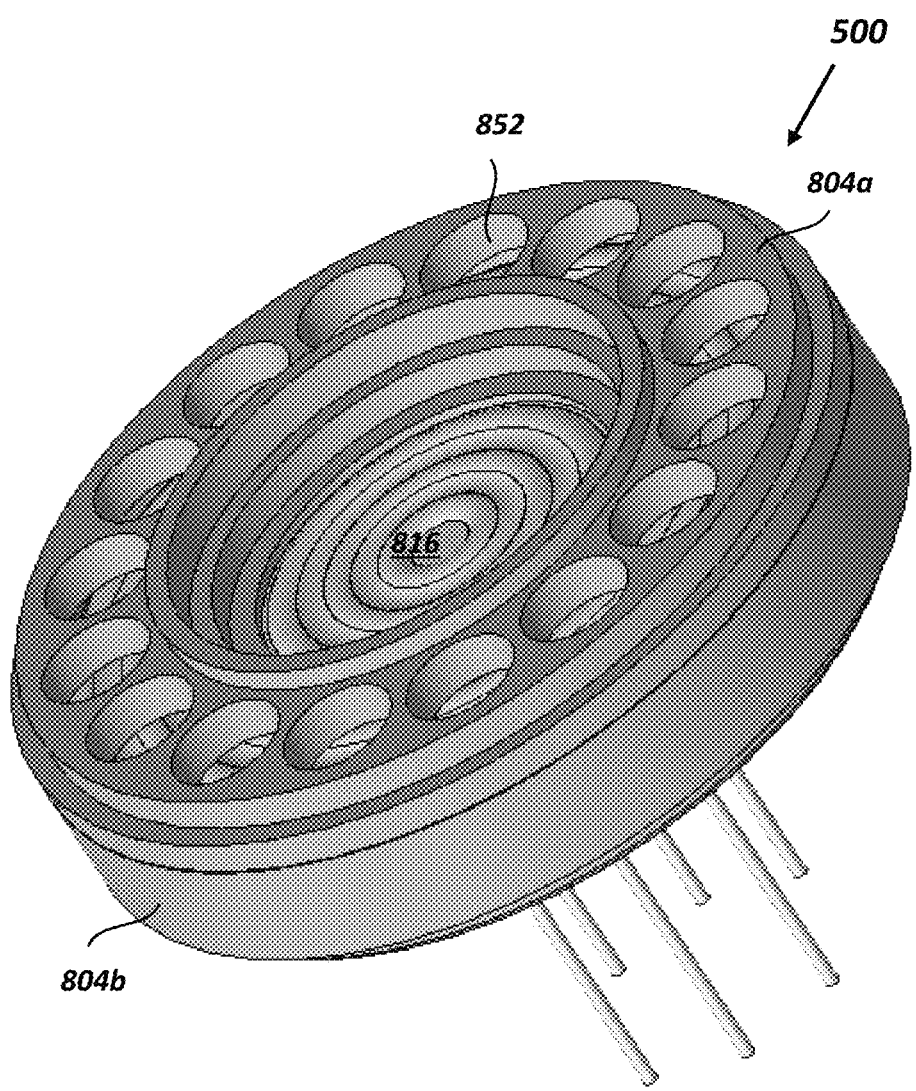
FIG. 8B is an isometric cross-sectional view illustrating fully balanced sensor package of FIG. 8A.
Figure 8C:
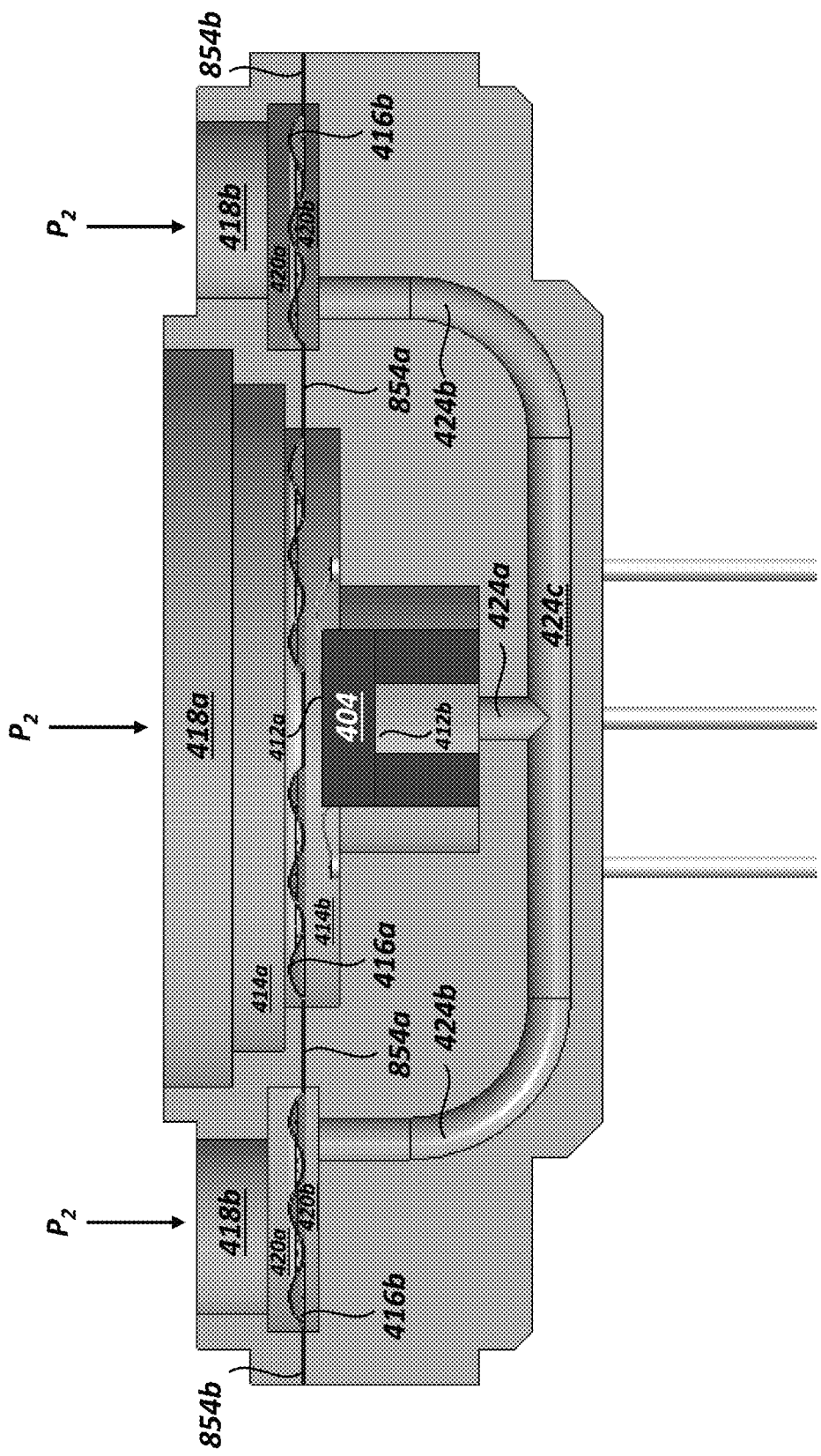
FIG. 8C is a cross-sectional view illustrating fully balanced sensor package of FIG. 8A.

FIGS. 8A-8C illustrate an exemplary embodiment of the balanced pressure sensor package 402 in the form of a balanced pressure sensor package 802. As shown, the balanced pressure sensor package 802 can include the differential pressure sensor 404, a body 804 including a first body half 804a and a second body half 804b, a diaphragm 816, and the plurality of fluid passageways 424a, 424b, 424c.

As shown, the diaphragm 816 adopts the form of the single diaphragm 600 with spacer 602 separating the primary and secondary diaphragms 416a, 416b. However, in alternative embodiments, the diaphragm 816 can adopt the form of any of the diaphragms discussed herein (e.g., 600, 604, 700).

The first and second intakes 418a, 418b can be defined in the first body half 804a. As shown, the first intake 418a can be formed as a single channel 850 in fluid communication with the primary diaphragm 416a. The second intake 418 can be formed as a plurality of discrete channels 852 formed around the single channel 850 and in fluid communication with the secondary diaphragm 416b. The shape of the first body half 804a can be configured such that the first body half 804a functions as an adapter to other fluid passageways, allowing the first intake 418a to receive a first fluid at the first pressure $P_1$ and the second intake 418b to receive a second fluid at the second pressure $P_2$.

The sensor chamber 414 and the annular chamber 420 can be further defined by the first body half 804a, the second body half 804b, and the diaphragm 816. The first sensor chamber part 414a can be defined between the first body half 804a (e.g., first intake 418a) and the primary diaphragm 416a. The second sensor chamber part 414b can be defined between the primary diaphragm 416a, the second body half 804b, and the first sensor face 412b. The first annular chamber part 420a can be defined between the first body half 804a (e.g., second intake 418b) and the secondary diaphragm 416b. The second annular chamber part 420b can be defined between the secondary diaphragm 416b and the second body half 804b.

As further shown in FIG. 8C, the diaphragm 816 and the body can form a plurality of seals (e.g., fluid-tight or hermetic seals). A first seal 854a can extend between the sensor chamber 416 and the annular chamber 420. A second seal 854b can extend about a circumference of the annular chamber 420.

A portion of the plurality of fluid passageways 424a, 424b, 424c can be curved, such as the connection or transition between the second fluid passageway 424b and the third fluid passageway 424c.

Figure 9:
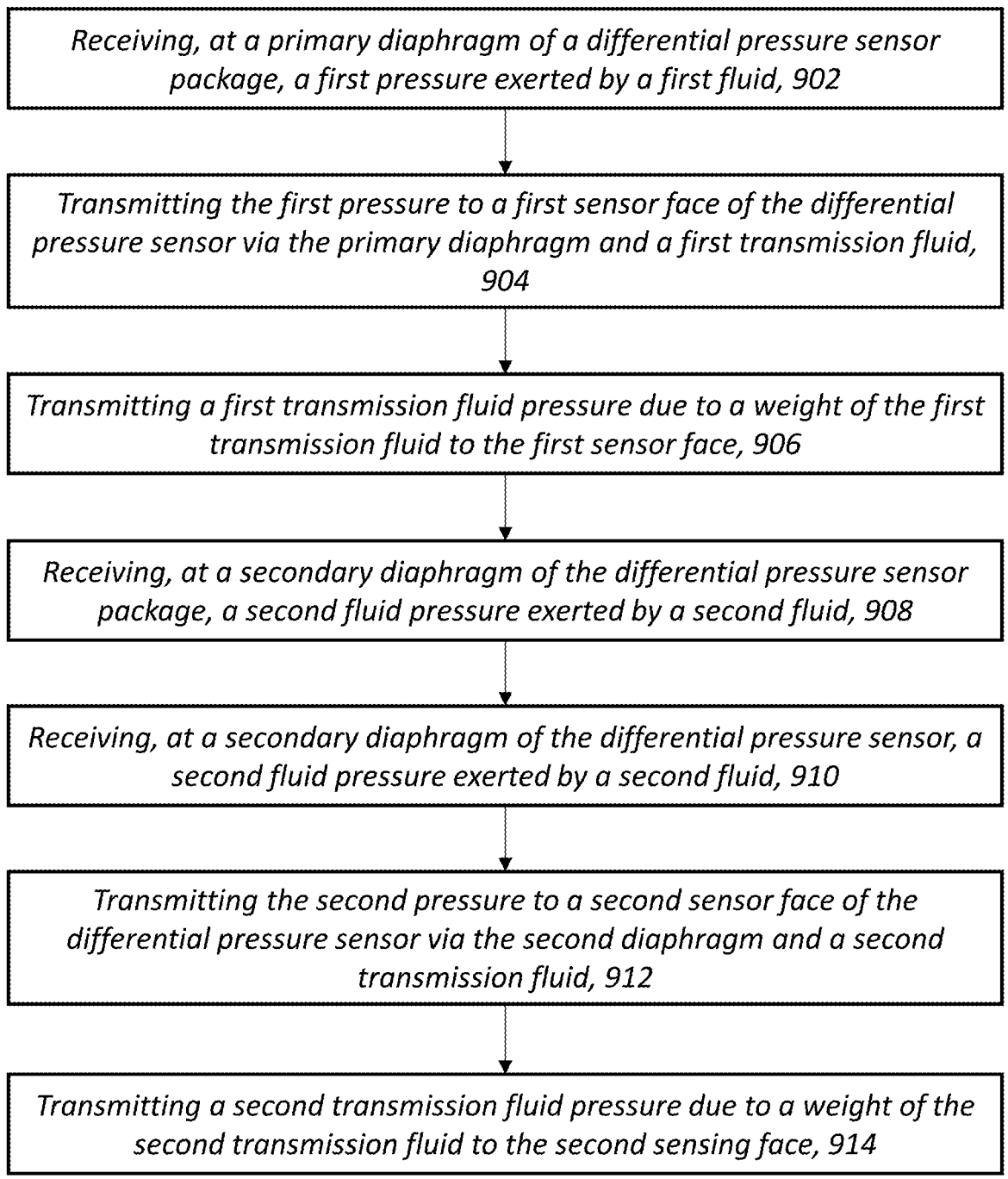
FIG. 9 is a flow diagram illustrating an embodiment of a method for differential pressure measurement.

FIG. 9 is a flow diagram illustrating one exemplary embodiment of a method 900 for differential pressure measurement. As shown, the method includes operations 902-914, discussed in the context of FIGS. 4-8. However, in alternative embodiments, the method can include greater or fewer operations and the operations can be performed in an order different than that illustrated in FIG. 9.

In operation 902, a first pressure (e.g., $P_1$) exerted by a first fluid (e.g., $F_1$) can be received at the primary diaphragm (e.g, 416a) of a balanced pressure sensor package (e.g., 402, 802). The primary diaphragm 416a can be positioned within a sensor chamber (e.g., 414) of the balanced pressure sensor package 402, 802. The primary diaphragm 416a can further divide the sensor chamber 414 into a first part 414a and a second part 414b. The first sensor chamber part 414a can be in fluid communication with the first fluid $F_1$. The second sensor chamber part 414b can include a differential pressure sensor 404 and a first transmission fluid (e.g., $T_1$). The differential pressure sensor 404 can have a first sensor face 412a and an opposing second sensor face 412b. The differential pressure sensor 404, the sensor chamber 416, and the primary diaphragm 416a can be approximately centered with respect to a sensor axis (e.g., A").

In operation 904, the first pressure $P_1$ can be transmitted to the first sensor face 412a of the differential pressure sensor 404 via the primary diaphragm 416a and the first transmission fluid $T_1$. That is, the first fluid $F_1$ can be in contact with a first surface of the primary diaphragm 416a and transmit the first pressure $P_1$ to the primary diaphragm 416a. In response, the primary diaphragm 416a can transmit the first pressure $P_1$ to the first transmission fluid $T_1$, which is in contact with a second surface of the primary diaphragm 416a, opposite the first surface. The first transmission fluid $T_1$, in contact with the first sensor face 412a, can further transmit the first pressure $P_1$ to the first sensor face 412a.

In operation 906, a first transmission fluid pressure can be transmitted to the first sensor face 412a. As discussed above, the first transmission fluid pressure can be due to have a magnitude dependent upon the height H1 of the column of the first transmission fluid $T_1$ positioned above the first sensor face 412a.

In operation 910, a second pressure (e.g., $P_2$) exerted by a second fluid (e.g., $F_2$) can be received at a secondary diaphragm (e.g, 416b) of the balanced pressure sensor package (e.g., 402, 802). The secondary diaphragm 416b can be positioned within an annular chamber (e.g., 420) of the balanced pressure sensor package 402, 802 that extends about the sensor chamber 414. That is, the sensor chamber 416 is positioned within a central void space defined by the circumference of the annular chamber 420. The secondary diaphragm 416b can further divide the annular chamber 420 into a first part 426a and a second part 420b. The first annular chamber part 420a can be in fluid communication with the second fluid $F_2$. The second annular chamber part 420b can include a second transmission fluid (e.g., $T_2$). The second transmission fluid $T_2$ can further be in fluid communication with the second sensor face 412b (e.g., via the plurality of fluid passageways 424a, 424b, 424c). The annular chamber 420 and the secondary diaphragm 416b can be approximately centered with respect to the sensor axis A".

In operation 912, the second pressure $P_1$ can be transmitted to the second sensor face 412b of the differential pressure sensor 404 via the secondary diaphragm 416b and the second transmission fluid $T_2$. That is, the second fluid $F_2$ can be in contact with a first surface of the secondary diaphragm 416b and transmit the second pressure $P_2$ to the secondary diaphragm 416b. In response, the secondary diaphragm 416b can transmit the second pressure $P_2$ to the second transmission fluid $T_2$, which is in contact with a second surface of the secondary diaphragm 416b, opposite the first surface. The second transmission fluid $T_2$ can extend between the secondary diaphragm 416b and the second sensor face 412b, within the plurality of fluid passageways 424a, 424c, and transmit the second pressure $P_2$ to the second sensor face 412b.

In operation 914, a second transmission fluid pressure can be transmitted to the second sensor face 412b. As discussed above, the second transmission fluid pressure can be due to the net height of a column of the second transmission fluid $T_2$ acting on the second sensor face 412b. The column of the second transmission fluid $T_2$ within the fluid passageway 424b has a height H3 and its weight acts in the direction of the second sensor face 412b. The column of the second transmission fluid $T_2$ within the fluid passageway 424a has a height H3 and exerts its weight in a direction opposite that of the weight of the second transmission fluid $T_2$ within the fluid passageway 424b. Because the height H3 is greater than the height H2, the net second transmission fluid pressure exerted on the second sensor face 412b is in the direction of the second sensor face and has a magnitude dependent upon the difference of height H3 and H2. As shown in FIG. 4, the difference H3-H2 is equal to H1, the same as the height of the first transmission fluid $T_1$. Thus, the first transmission fluid pressure is approximately equal in magnitude and opposite in direction to the second transmission fluid pressure.

In certain embodiments, the first transmission fluid pressure and the second transmission fluid pressure can be approximately equal in magnitude and opposite in direction at any orientation of the differential pressure sensor 404 with respect to a direction of acceleration. As discussed above the primary diaphragm 416a and the sensor chamber 414 can adopt a symmetrical shape (e.g., circular, square, etc.) and be approximately centered with respect to the sensor axis A". Furthermore, the secondary diaphragm 416b and the annular chamber 420 can be approximately centered with respect to the sensor axis A'. So configured, regardless of orientation of the differential pressure sensor to an applied acceleration, the net height difference H3–H2 of the second transmission fluid $T_1$ remains approximately equal to the height H1 of the first transmission fluid $T_1$, Thus, the first transmission fluid pressure is approximately equal in magnitude and opposite in direction to the second transmission fluid pressure.

Embodiments of the primary and secondary diaphragms 416aq, 416b can vary. As discussed above, in certain embodiments, the primary diaphragm 416a and the secondary diaphragm 416b can be in the form of a single diaphragm 600. The single diaphragm 600 can be portions of a single, generally circular diaphragm (e.g., 600). The primary and secondary diaphragms 416aq, 416b can be separated from one another by a fluid-tight seal (e.g., 854a) interposed between the sensor chamber 414 and the annular chamber 420.

The primary and secondary diaphragms 416a, 416b can be positioned with respect to one another in the direction of the sensor axis A" such that the first transmission fluid pressure is approximately equal in magnitude and opposite in direction to the second transmission fluid pressure.

Exemplary technical effects of the methods, systems, and devices described herein include, by way of non-limiting example, measurement of differential pressure with high accuracy in high vibration and/or acceleration environments. In certain aspects, high accuracy different pressure measurements can be achieved independent of the orientation of a differential pressure sensor contained within a sensor package with respect to a direction of acceleration. Beneficially, correction of the orientation of the sensor package after installation to maintain high accuracy of differential pressure measurements can be eliminated.

Certain exemplary embodiments have been described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A pressure sensing package, comprising:
   a body including a sensor chamber and an annular chamber, wherein the sensor chamber is positioned radially inward of an inner circumference of the annular chamber, and wherein the sensor chamber and the annular chamber are approximately centered with respect to a sensor axis;
   a primary diaphragm positioned within the sensor chamber and dividing the sensor chamber into a first part and a second part, wherein the first sensor chamber part is configured to receive a first pressure via a first intake, and the second sensor chamber part includes a differential pressure sensor approximately centered with respect to the sensor axis and a first transmission fluid configured to transmit the first pressure to a first sensor face of the differential pressure sensor;
   a secondary diaphragm positioned within the annular chamber and dividing the annular chamber into a first part and a second part, wherein the first annular chamber part is configured to receive a second pressure via a second intake, and the second annular chamber part includes a second transmission fluid; and
   a plurality of fluid passageways in fluid communication with the second annular chamber part and a second sensor face of the differential pressure sensor via the second transmission fluid, wherein the second pressure is transmitted to the second sensor face via the secondary diaphragm and the second transmission fluid;
   wherein the primary diaphragm and the secondary diaphragm are positioned with respect to one another in the direction of the sensor axis such that a first transmission fluid pressure exerted upon the first sensor face of the differential pressure sensor due to a weight of the first transmission fluid is approximately equal in magnitude and opposite in direction to a second transmission fluid pressure exerted upon the second sensor face of the differential pressure sensor, opposite the first sensor face, due to a weight of the second transmission fluid.

2. The pressure sensor package of claim 1, wherein the first transmission fluid pressure and the second transmission fluid pressure are approximately equal in magnitude and opposite in direction at any orientation of the differential pressure sensor with respect to a direction of acceleration.

3. The pressure sensor package of claim 1, wherein the sensor chamber and the primary diaphragm are approximately circular.

4. The pressure sensor package of claim 1, wherein the first transmission fluid and the second transmission fluid are approximately incompressible fluids.

5. The pressure sensing package of claim 1, wherein the first intake and the second intake are positioned on the same side of the body.

6. The pressure sensor package of claim 1, wherein the primary diaphragm and the secondary diaphragm are formed as separate diaphragms, the primary diaphragm possessing an approximately circular shape and the secondary diaphragm possessing an approximately annular shape.

7. The pressure sensor package of claim 6, wherein the primary diaphragm and the secondary diaphragm are approximately co-planar.

8. The pressure sensor package of claim 1, wherein a first diaphragm pressure, exerted upon the first sensor face of the differential pressure sensor due to a weight of the primary diaphragm, is approximately equal in magnitude and opposite in direction to a second diaphragm pressure exerted upon the second sensor face of the differential pressure sensor due to a weight of the secondary diaphragm.

9. The pressure sensor package of claim 8, wherein the primary diaphragm and the secondary diaphragm are not co-planar.

10. The pressure sensor package of claim 1, wherein the primary diaphragm and the secondary diaphragm are portions of a single generally circular diaphragm.

11. The pressure sensor package of claim 10, wherein the primary diaphragm and the secondary diaphragm are separated from one another by a fluid-tight seal interposed between the sensor chamber and the annular chamber.

12. The pressure sensor package of claim 10, wherein the primary diaphragm and the secondary diaphragm are approximately co-planar.

13. A method for differential pressure sensing, comprising:
   receiving, at a primary diaphragm of a differential pressure sensor package, a first fluid pressure exerted by a first fluid, the primary diaphragm being positioned within a sensor chamber and dividing the sensor chamber into a first sensor chamber part in fluid communication with the first fluid and a second sensor chamber part including a differential pressure sensor and a first transmission fluid, the differential pressure sensor being approximately centered with respect to a sensor axis;
   transmitting the first pressure to a first sensor face of the differential pressure sensor via the primary diaphragm and the first transmission fluid;
   transmitting a first transmission fluid pressure due to a weight of the first transmission fluid to the first sensor face;
   receiving, at a secondary diaphragm of the differential pressure sensor package, a second fluid pressure exerted by a second fluid, the secondary diaphragm being positioned within an annular chamber extending about the sensor chamber and dividing the annular chamber into a first annular chamber part in fluid communication with the second fluid and a second annular chamber part including a second transmission fluid in fluid communication with a second sensor face of the differential pressure sensor;
   transmitting the second pressure to the second sensor face of the differential pressure sensor via the secondary diaphragm and the second transmission fluid;
   transmitting a second transmission fluid pressure due to a weight of the second transmission fluid to the second sensor face;
   wherein the sensor chamber is positioned radially inward of an inner circumference of the annular chamber; and
   wherein the primary and secondary diaphragms are approximately centered with respect to the sensor axis and are positioned with respect to one another in the direction of the sensor axis such that the first transmission fluid pressure is approximately equal in magnitude and opposite in direction to the second transmission fluid pressure.

14. The method of claim 13, wherein the first transmission fluid pressure and the second transmission fluid pressure are approximately equal in magnitude and opposite in direction at any orientation of the differential pressure sensor with respect to a direction of acceleration.

15. The method of claim 13, wherein the sensor chamber and the primary diaphragm are approximately circular.

16. The method of claim 13, wherein the first fluid pressure is received via a first intake and the second fluid pressure is received at a second intake, and wherein the first intake and the second intake are positioned on the same side of the differential pressure sensor package.

17. The method of claim 13, wherein a first diaphragm pressure exerted upon the first sensor face of the differential pressure sensor due to a weight of the primary diaphragm is approximately equal in magnitude and opposite in direction to a second diaphragm pressure exerted upon the second sensor face of the differential pressure sensor.

18. The method of claim 17, wherein the primary diaphragm and the secondary diaphragm are not co-planar.

19. The method of claim 13, wherein the primary diaphragm and the secondary diaphragm are portions of a single, generally circular diaphragm.

20. The method of claim 19, wherein the primary diaphragm and the secondary diaphragm are separated from one another by a fluid-tight seal interposed between the sensor chamber and the annular chamber.

21. The method of claim 20, wherein the primary diaphragm and the secondary diaphragm are approximately co-planar.

22. The method of claim 20, wherein the primary diaphragm and the secondary diaphragm are formed as separate diaphragms, the primary diaphragm possessing an approximately circular shape and the secondary diaphragm possessing an approximately annular shape.

23. The method of claim 22, wherein the primary diaphragm and the secondary diaphragm are approximately co-planar.

\* \* \* \* \*